United States Patent
Lee et al.

(10) Patent No.: US 9,241,071 B2
(45) Date of Patent: Jan. 19, 2016

(54) METHOD AND APPARATUS FOR MOVING CALL

(71) Applicant: Samsung Electronics Co., Ltd., Gyeonggi-do (KR)

(72) Inventors: Joo-Hong Lee, Seoul (KR); Chul-Hoon Hwang, Gyeonggi-do (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 0 days.

(21) Appl. No.: 14/335,740

(22) Filed: Jul. 18, 2014

(65) Prior Publication Data

US 2015/0023488 A1 Jan. 22, 2015

(30) Foreign Application Priority Data

Jul. 18, 2013 (KR) ........................ 10-2013-0084800

(51) Int. Cl.
*H04M 3/42* (2006.01)
*H04M 3/54* (2006.01)
*H04W 4/16* (2009.01)
*H04M 3/58* (2006.01)

(52) U.S. Cl.
CPC .................. *H04M 3/54* (2013.01); *H04M 3/58* (2013.01); *H04W 4/16* (2013.01)

(58) Field of Classification Search
CPC ....... H04M 1/72; H04M 1/7253; H04M 3/54; H04M 3/541; H04M 3/543; H04M 3/545; H04M 3/546; H04M 3/548; H04M 9/00; H04M 9/001; H04M 15/93; H04M 2215/32; H04M 2250/02; H04M 2250/04; H04M 2250/06; H04M 4/16

USPC ............. 379/201.01, 211.01, 211.02, 211.03, 379/211.04, 211.05, 212.01
See application file for complete search history.

(56) References Cited

U.S. PATENT DOCUMENTS

| | | | |
|---|---|---|---|
| 7,606,223 B2 * | 10/2009 | Zaniolo et al. ................. | 370/352 |
| 2007/0032225 A1 * | 2/2007 | Konicek et al. ............... | 455/417 |
| 2007/0104122 A1 * | 5/2007 | Zaniolo et al. ................. | 370/282 |
| 2007/0281682 A1 * | 12/2007 | Raju et al. .................... | 455/422.1 |
| 2008/0039080 A1 * | 2/2008 | Bertagnole et al. ........... | 455/433 |
| 2009/0034710 A1 * | 2/2009 | Suzukawa et al. ........ | 379/220.01 |
| 2010/0151845 A1 * | 6/2010 | Rountree ....................... | 455/417 |
| 2010/0189094 A1 * | 7/2010 | Gray et al. ..................... | 370/352 |
| 2011/0081925 A1 * | 4/2011 | Kwon et al. ................... | 455/466 |
| 2011/0238862 A1 * | 9/2011 | Chaturvedi et al. ........... | 709/238 |
| 2012/0157059 A1 * | 6/2012 | Raju et al. ..................... | 455/411 |
| 2013/0064106 A1 * | 3/2013 | Sylvain ......................... | 370/252 |
| 2013/0115932 A1 * | 5/2013 | Williams et al. .............. | 455/417 |
| 2013/0183950 A1 * | 7/2013 | Hwang .......................... | 455/417 |
| 2014/0073300 A1 * | 3/2014 | Leeder et al. ................. | 455/416 |

* cited by examiner

*Primary Examiner* — Khai N Nguyen

(57) ABSTRACT

An operation method and apparatus of a terminal for call move are provided. The method includes, if receiving a call move request signal including registration information of a first device that is in voice communication with a second device from the first device, transmitting, by the terminal, a call state request signal for the first device using the registration information to a server, if determining that a call state for the first device is not a call through the server by using a call state response signal received from the server, establishing, by the terminal, a wireless connection with the first device, and, performing, by the terminal, voice communication with the second device through the established wireless connection.

20 Claims, 13 Drawing Sheets

METHOD AND APPARATUS FOR MOVING CALL

CROSS-REFERENCE TO RELATED APPLICATION(S) AND CLAIM OF PRIORITY

The present application is related to and claims priority under 35 U.S.C. §119(a) to a Korean Patent Application filed in the Korean Intellectual Property Office on Jul. 18, 2013, and assigned Serial No. 10-2013-0084800, the contents of which are herein incorporated by reference.

TECHNICAL FIELD

The present invention relates to call move between terminals in an enterprise network environment.

BACKGROUND

When a user intended to move a call from a desk phone to a mobile terminal, he/she can transfer the call using a transfer flow, or pressed a shortcut button of the desk phone to move the call to a mobile terminal of a number designated to the shortcut button.

And, when the user was in conversation through the mobile terminal, he/she may not be able to move a call from the mobile terminal to the desk phone, or could receive a service of only an extension call connected to an enterprise server.

In a case where the user used a service of call move between terminals in a terminal interworking with the enterprise server and providing a conversation service, there can be a limit that he/she could receive a service of only a call connected through the enterprise server.

That is, in a case where the user is making a mobile communication call through a 3-Generation/Long Term Evolution (3G/LTE) system, that the user may not be able to move a call to the desk phone even when desiring to do so.

SUMMARY

To address the above-discussed deficiencies, it is a primary object to provide a method and apparatus for moving a call.

In a first example, a method and apparatus are provided for, if there is a request for a service of call move between terminals, querying an enterprise server whether call move is possible and, if the call move is possible, moving a call through Voice over Internet Protocol (VoIP) signaling.

In a second example, a method and apparatus are provided for, if there is a request for a service of call move between terminals, querying an enterprise server whether call move is possible and, if the call move is impossible, providing a service capable of setting and connecting Bluetooth between the terminals and maintaining conversation.

In a third embodiment, an operation method of a terminal for call move includes, if receiving a call move request signal including registration information of a first device that is in voice communication with a second device from the first device, transmitting, by the terminal, a call state request signal for the first device using the registration information to a server. The method also includes if determining that a call state for the first device is not a call through the server by using a call state response signal received from the server, establishing, by the terminal, a wireless connection with the first device, and, performing, by the terminal, voice communication with the second device through the established wireless connection.

In a fourth example, an operation method of a server for call move includes receiving, by the server, a call state request signal for a first device from a terminal. The method also includes deciding, by the server, a call state for the first device using registration information of the $1^{st}$ device included in the call state request signal. The method further includes in accordance to the decision of the call state for the first device, transmitting, by the server, a call state response signal to the terminal.

In a fifth example, an apparatus of a terminal for call move includes a communication unit configured to communicate with another node. The apparatus also includes a control unit. The control unit is configured to, if receiving a call move request signal including registration information of a first device that is in voice communication with a second device from the first device, control the communication unit to transmit a call state request signal for the first device to a server using the registration information. The control unit is also configured to if determining that a call state for the first device is not a call through the server by using a call state response signal received from the server, establish a wireless connection with the first device, and performing voice communication with the second device through the established wireless connection.

In a sixth example, an apparatus of a server for call move includes a communication unit configured to communicate with another node. The apparatus also includes a control unit. The control unit is configured to, if receiving a call state request signal for a first device from a terminal, decide a call state for the first device using registration information of the first device included in the call state request signal, and control the communication unit to transmit a call state response signal to the terminal, in accordance to the decision of the call state for the first device.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication terminal. Various exemplary embodiments of the present disclosure will be described herein below with reference to the accompanying drawings. In describing the present disclosure, well-known functions or constructions are not described in detail since they would obscure the disclosure in unnecessary detail. And, terms described below, which are defined considering functions in the present disclosure, can be modified in accordance to user and operator's intention or practice. Therefore, the definition should be given on the basis of the content throughout the present specification.

Below, the present disclosure will be described for a method and apparatus for moving a call.

The present disclosure relates to a method and apparatus for easily providing service setting and call move service, through data transmission/reception which uses Near Field Communication (NFC) and Bluetooth protocol between a terminal (e.g., a desk phone) interworking with an enterprise server and a mobile terminal (e.g., a Fixed Mobile Convergence (FMC) phone, and a cellular phone) of a user.

In the following description, the terminal and the mobile terminal includes a mobile communication terminal supporting wireless communication, a smart phone, a tablet Personal Computer (PC), a digital camera, a Moving Picture Experts Group (MPEG) Audio Layer 3 (MP3) player, a navigator, a laptop, a netbook, and the like.

Figure 1:
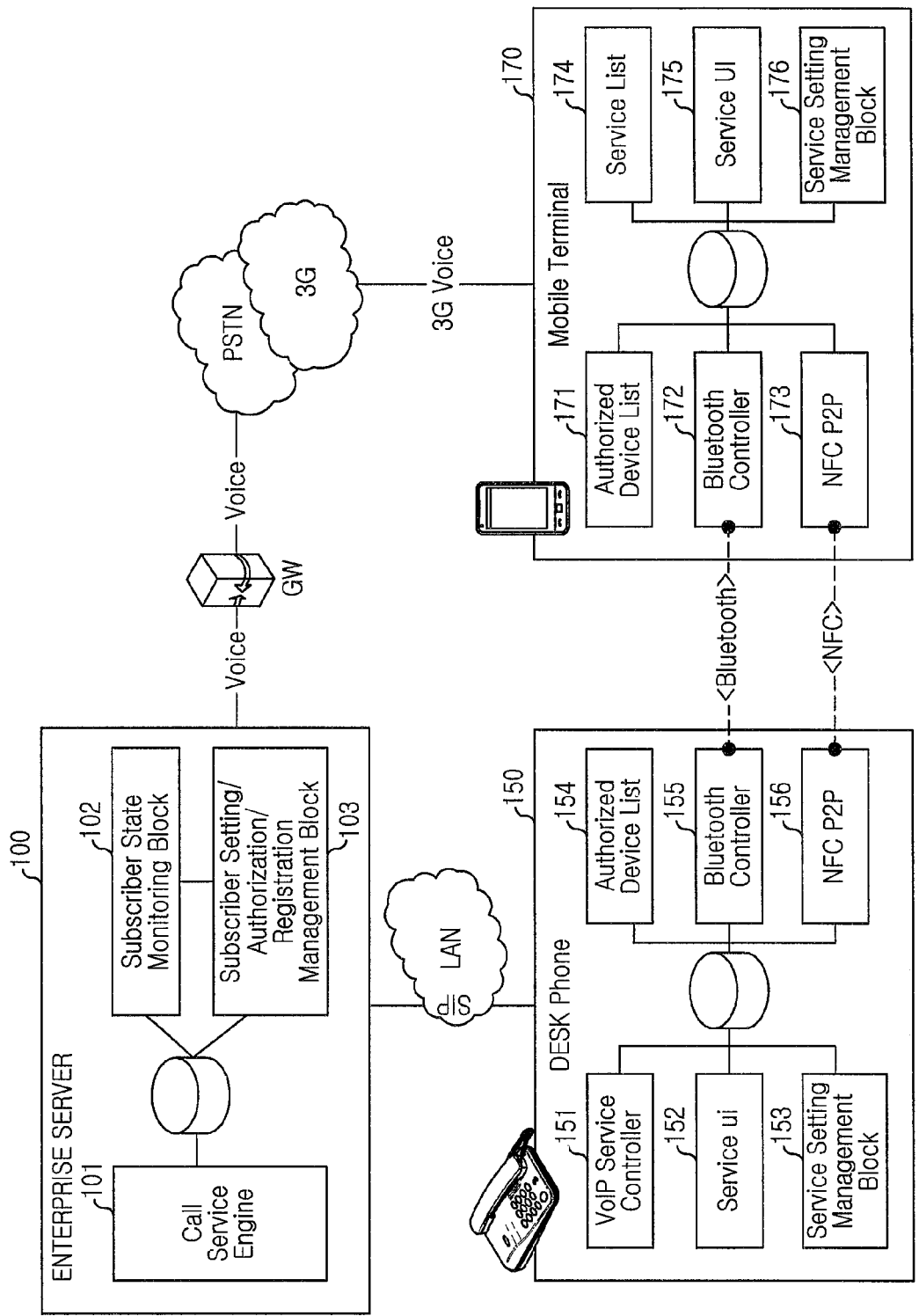
FIG. 1 is a block diagram illustrating an example structure of an enterprise network according to this disclosure.

FIG. 1 is a block diagram illustrating an example structure of an enterprise network according to this disclosure.

Referring to FIG. 1, the enterprise network includes an enterprise server 100, a desk phone 150, and a mobile terminal 170.

The enterprise server 100 includes a call service engine 101, a subscriber state monitoring block 102, and a subscriber setting/authorization/registration management block 103. The subscriber setting/authorization/registration management block 103 can takes charge of a function of setting, authorizing and registering a subscriber to the enterprise server 100. The call service engine 101 provides a call service to the registered subscriber. The subscriber state monitoring block 102 monitors a current state of a requested subscriber or a specific subscriber among subscribers. For example, the subscriber state monitoring block 102 decides whether the subscriber is receiving the call service through the enterprise server 100.

The desk phone 150 includes a Voice over Internet Protocol (VoIP) service controller 151, a service User Interface (UI) 152, and a service setting management block 153. The VoIP service controller 151 controls VoIP telephony. By providing a user interface to a user, receiving an instruction from the user through the user interface, and providing the instruction to the corresponding function block in accordance to the kind of the instruction, the service UI 152 enables the user to control the execution of a function of the desk phone 150 through the user interface. The service setting management block 153 takes charge of a function of interworking with the enterprise server 100 and the mobile terminal 170.

Also, the desk phone 150 includes an authorized device list block 154, a Bluetooth controller 155, and an NFC Peer-to-Peer (P2P) block 156. The authorized device list block 154 manages information about authorized terminals. The Bluetooth controller 155 performs Bluetooth communication. The NFC P2P block 156 takes charge of NFC communication.

The mobile terminal 170 includes an authorized device list block 171, a Bluetooth controller 172, and an NFC P2P block 173. The authorized device list block 171 manages information about authorized terminals. The Bluetooth controller 172 performs Bluetooth communication. The NFC P2P block 173 takes charge of NFC communication.

The mobile terminal 170 includes a service list block 174, and a service UI 175. The service list block 174 manages interworking services with the desk phone 150 and the enterprise server 100. By providing a user interface to a user, receiving an instruction from the user through the user interface, and providing the instruction to the corresponding function block in accordance to the kind of the instruction, the service UI 175 enables the user to control the execution of a function of the mobile terminal 170 through the user interface.

Also, the mobile terminal 170 includes a service setting management block 176 taking charge of a function of interworking with the enterprise server 100 and the desk phone 150.

Figure 2:
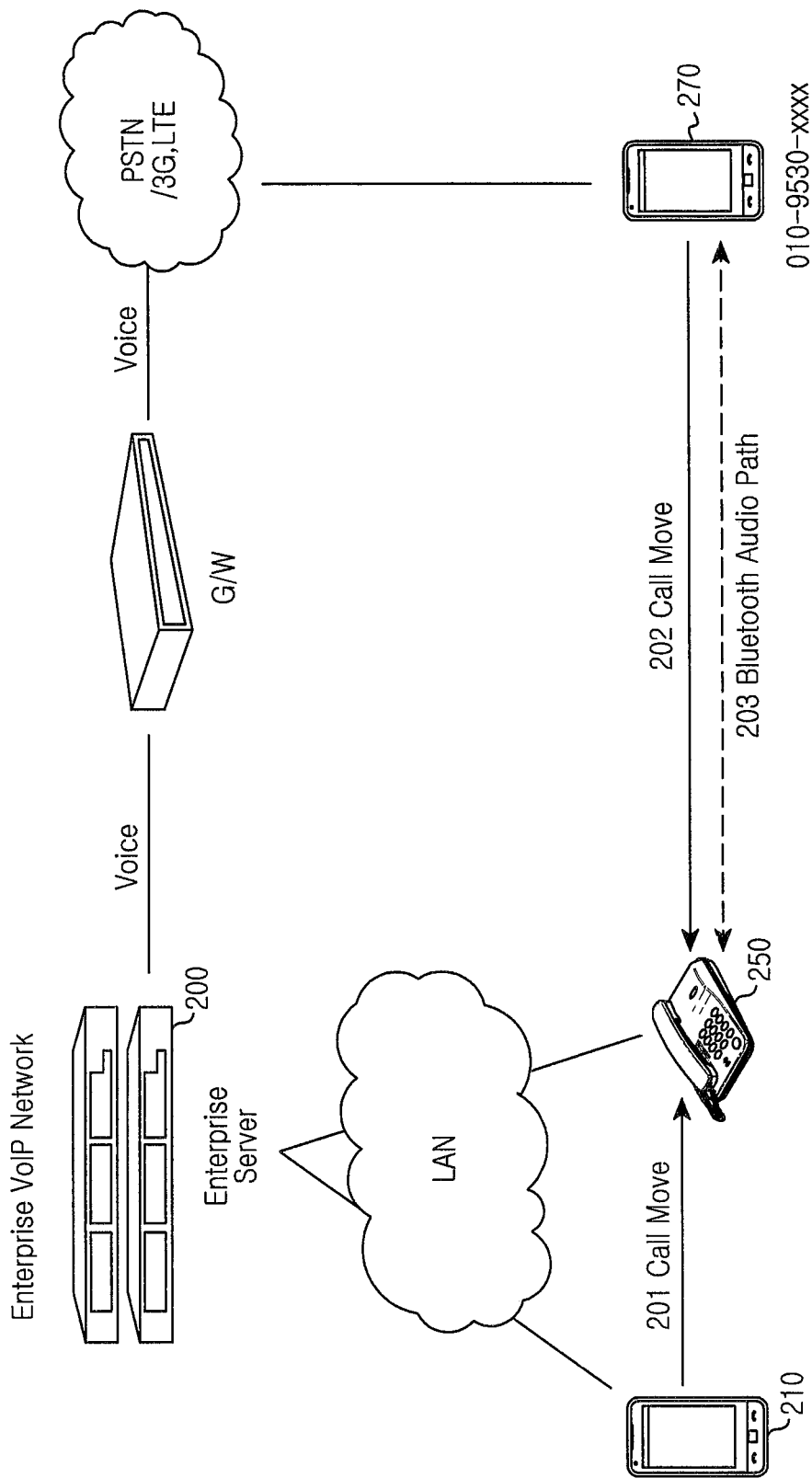
FIG. 2 is a diagram schematically illustrating an example call move process between terminals according to this disclosure.

FIG. 2 is a diagram schematically illustrating an example call move process between terminals according to this disclosure.

Referring to FIG. 2, a desk phone 250 receiving a call move request from a mobile terminal 210 can perform call move of the mobile terminal 210 which has requested a currently called/incoming call to an enterprise server 200 through VoIP signal transmission (step 201).

Similarly, the desk phone 250 receiving a call move request from a mobile terminal 270 can perform call move of the mobile terminal 270 which has requested a currently called/incoming call to the enterprise server 200 through VoIP signal transmission (step 202).

This case is a case in which a call on busy goes through the enterprise server 200.

However, the aforementioned call move is not possible when conversation is being carried out from the mobile terminal 210 to the mobile terminal 270 through a call not going through the enterprise server 200.

The present disclosure includes querying the enterprise server 200 whether call move is possible and, if the call move is possible, performing the call move using the enterprise server 200 (steps 201 and 202) and, if the call move is impossible, establishing an audio path from the mobile terminal 270 to the desk phone 250 through Bluetooth connection and making possible the call move (step 203).

In the present disclosure, a call move request between terminals can be achieved through NFC communication. At NFC communication, a Bluetooth Media Access Control (MAC) address is transmitted together with terminal information and thus, a Bluetooth pairing process can be performed at one time.

Figure 3:
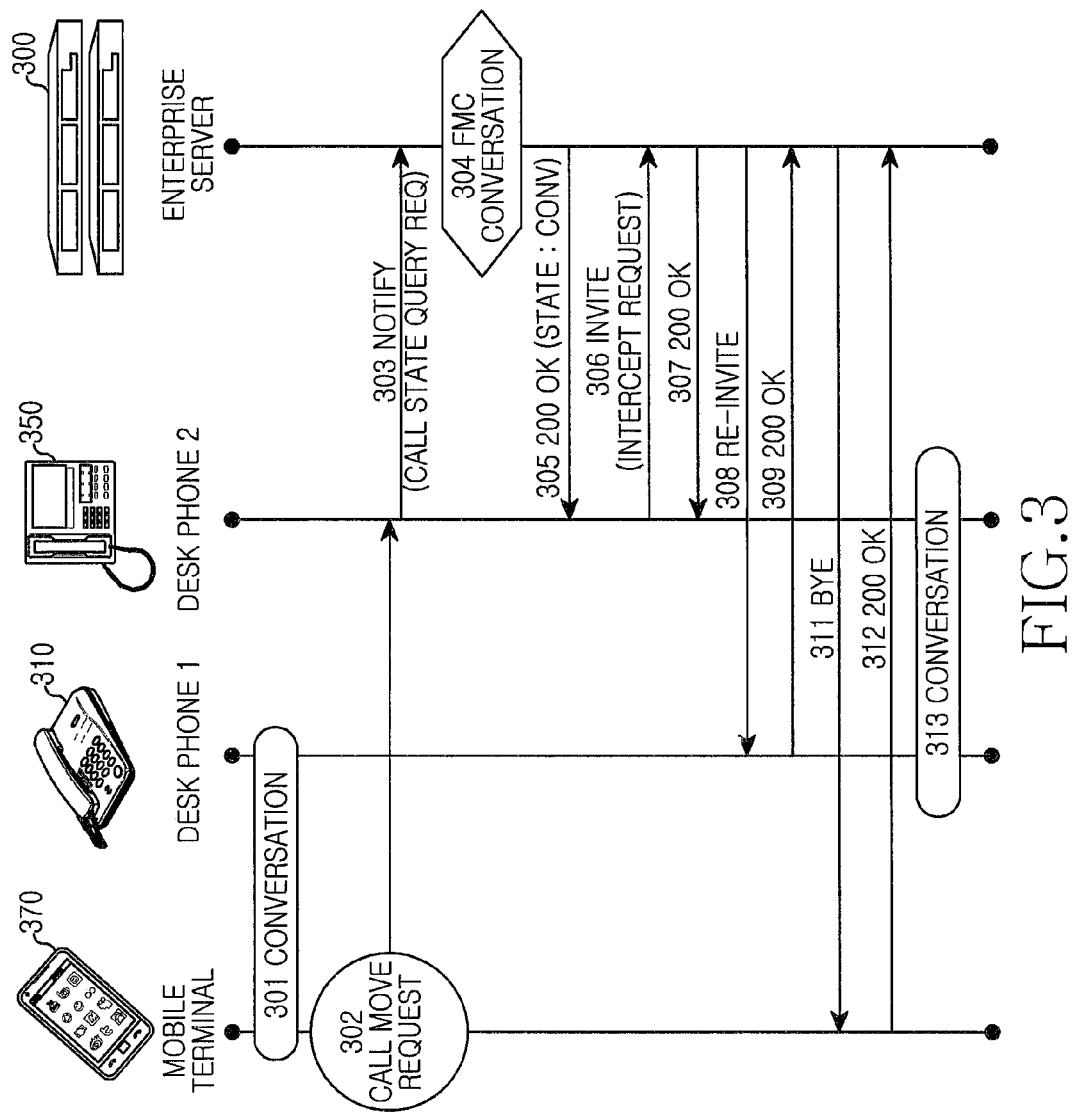
FIG. 3 is a message flowchart illustrating an example call move process between terminals according to at least a 1st embodiment of this disclosure.

FIG. 3 is a message flowchart illustrating an example call move process between terminals according to at least a 1st embodiment this disclosure.

Referring to FIG. 3, if there is a need to move a call of a mobile terminal 370 to a desk phone 2 350 during conversation with a desk phone 1 310 (step 301), the mobile terminal 370 transmits a call move request to the desk phone 2 350 (step 302).

This call move request can be performed by user's selection. And, the call move request between terminals can be achieved through NFC communication. At NFC communication, a Bluetooth MAC address is transmitted together with terminal information and thus, a Bluetooth pairing process can be performed at one time. Also, the call move request between the terminals can be transmitted using a dedicated application.

The call move request can include terminal registration information as follows. That is, the call move request can include information such as a phone number (such as a Mobile Identification Number (MIN)) or an extension phone number, a wireless Local Area Network (LAN) IP address and a wireless LAN MAC address (such as a wireless LAN IP address of a requesting terminal and a wireless LAN MAC address thereof), a request service type (such as a call move request), and a Bluetooth MAC address (such as a Bluetooth MAC address of the requesting terminal).

After that, the desk phone 2 350 transmits a call state request to an enterprise server 300 (step 303). The call state request is to request a state of a call that the mobile terminal 370 has requested to move. The desk phone 2 350 transmits the call state request to the enterprise server 300 using a Session Initiation Protocol (SIP) message. The SIP message can be a message such as NOTIFY, INFO and the like. In FIG. 3, utilization of the NOTIFY message is disclosed.

Next, if it is determined that the call state is in FMC conversation (step 304), the enterprise server 300 transmits to the desk phone 2 350 a response including that the call state is in the FMC conversation (step 305). Here, the enterprise server 300 searches a database for a MIN or extension phone number of the mobile terminal 370 having requested call state information and performs MIN or extension phone number registration or non-registration and conversation state query. Here, the FMC represents an application performing a VoIP service using Wireless Fidelity (WiFi) wireless communication.

The response including that the call state is in the FMC conversation can be a 200 OK message among the SIP message. The enterprise server 300 can add a proprietary header within the 200 OK message and notify the database search result to the desk phone 2 350.

Next, the desk phone 2 350 transmits a conversation connection for the call, to the enterprise server 300 (step 306). Here, an INVITE message is used among the SIP message. Here, because the desk phone 2 350 has been notified from the enterprise server 300 that it is a state where the call move is possible, the desk phone 2 350 transmits to the enterprise server 300 an originating request of requesting to move the call to the desk phone 2 350. After that, the enterprise server 300 transmits a response to the desk phone 2 350 (step 307).

Next, the enterprise server 300 transmits a conversation update request to the desk phone 1 310 (step 308). Here, a Re-INVITE message is used among the SIP message. The Re-INVITE message is a message of the same kind as that of the INVITE message or a message of requesting update for an existing established call. The call uses an existing call session between the desk phone 1 310 and the mobile terminal 370.

The desk phone 1 310 receiving the conversation update request from the enterprise server 300 updates a codec, a Real-time Transport Protocol (RTP) destination address, a RTP destination port, and the like such that the desk phone 1 310 can make conversation with the desk phone 2 350. That is, because the call has moved from the desk phone 1 310 to the desk phone 2 350, the desk phone 1 310 updates the codec, the RTP destination address, the RTP destination port, and the like such that the desk phone 1 310 can make conversation with the desk phone 2 350 through the moved call. The codec, the RTP destination address, the RTP destination port, and the like can be forwarded through the Re-INVITE message. After that, the desk phone 1 310 transmits a response to the enterprise server 300 (step 309). This represents that the call move is completed.

Next, the enterprise server 300 requests a conversation end to the mobile terminal 370 (step 311). Here, a BYE message is used among the SIP message. Next, the mobile terminal 370 transmits a response to the enterprise server 300 (step 312).

After that, conversation between the desk phone 1 310 and the desk phone 2 350 is carried out (step 313). Meantime, while performing voice communication, the desk phone 1 310 and the desk phone 2 350 perform data communication including Dual Tone Multi Frequency (DTMF) information. If there is a DTMF input to the desk phone 2 350, the desk phone 2 350 transmits information including the DTMF input to the desk phone 1 310.

Figure 4:
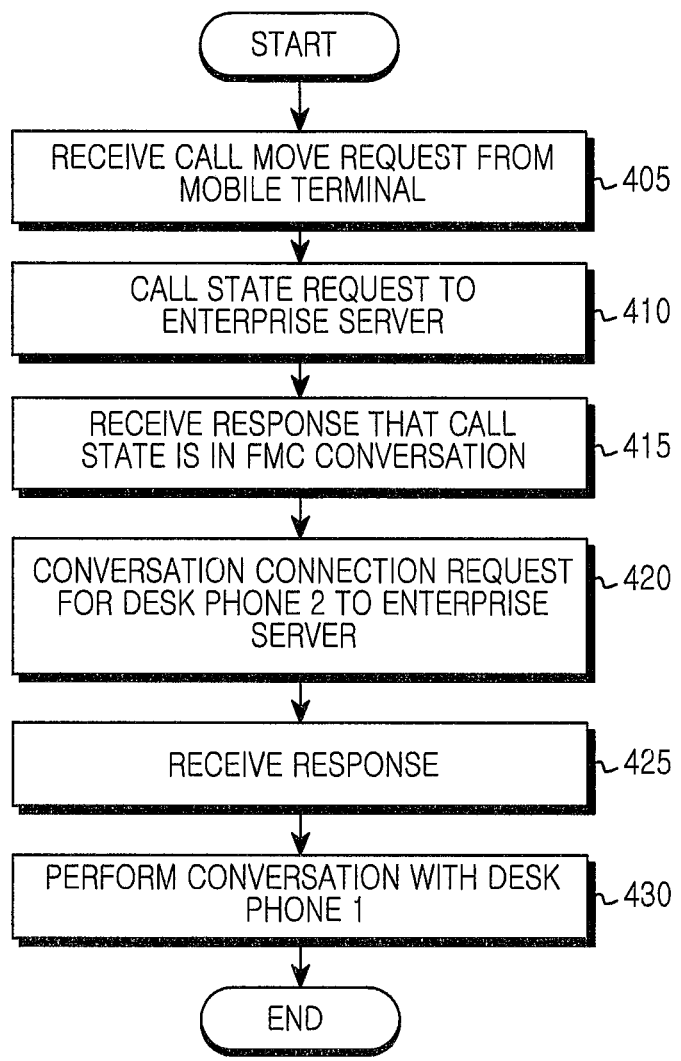
FIG. 4 is a flowchart illustrating an example operation process of a desk phone during a call move process between terminals according to this disclosure.

FIG. 4 is a flowchart illustrating an example operation process of a desk phone 2 during a call move process between terminals according to at least the 1st embodiment of this disclosure.

Referring to FIG. 4, the desk phone 2 receives a call move request from a mobile terminal (step 405). Here, it is a state where the mobile terminal is in conversation with a desk phone 1. This call move request can be performed by user's selection. And, the call move request between terminals can be achieved through NFC communication. At NFC communication, a Bluetooth MAC address is transmitted together with terminal information and thus, a Bluetooth pairing process can be performed at one time. Also, the call move request between the terminals can be transmitted using a dedicated application.

The call move request can include information as follows. That is, the call move request can include information such as a phone number (such as a MIN) or an extension phone number, a wireless LAN IP address and a wireless LAN MAC address (such as a wireless LAN IP address of a requesting terminal and a wireless LAN MAC address thereof), a request service type (such as a call move request), and a Bluetooth MAC address (such as a Bluetooth MAC address of the requesting terminal).

After that, the desk phone 2 transmits a call state request to an enterprise server (step 410). The call state request is to request a state of a call that the mobile terminal has requested to move. The desk phone 2 transmits the call state request to the enterprise server using a SIP message. The SIP message can be a message such as NOTIFY, INFO and the like.

After that, if receiving from the enterprise server a response including that the call state is in FMC conversation (step 415), the desk phone 2 transmits a conversation connection request for the call, to the enterprise server (step 420). Here, an INVITE message is used among the SIP message. Here, because the desk phone 2 has been notified from the enterprise server that it is a state where the call move is possible, the desk phone 2 transmits to the enterprise server an originating request of requesting to move the call to the desk phone 2. After that, the desk phone 2 receives a response from the enterprise server (step 425).

Here, the response including that the call state is in the FMC conversation can be a 200 OK message among the SIP message. The enterprise server can add a proprietary header within the 200 OK message and notify the database search result to the desk phone 2.

After that, the desk phone 2 makes conversation with the desk phone 1 (step 430). Next, if DTMF information is inputted to the desk phone 2 while voice communication is carried out between the desk phone 1 and the desk phone 2, the desk phone 2 transmits the inputted DTMF information to the desk phone 1.

Figure 5:
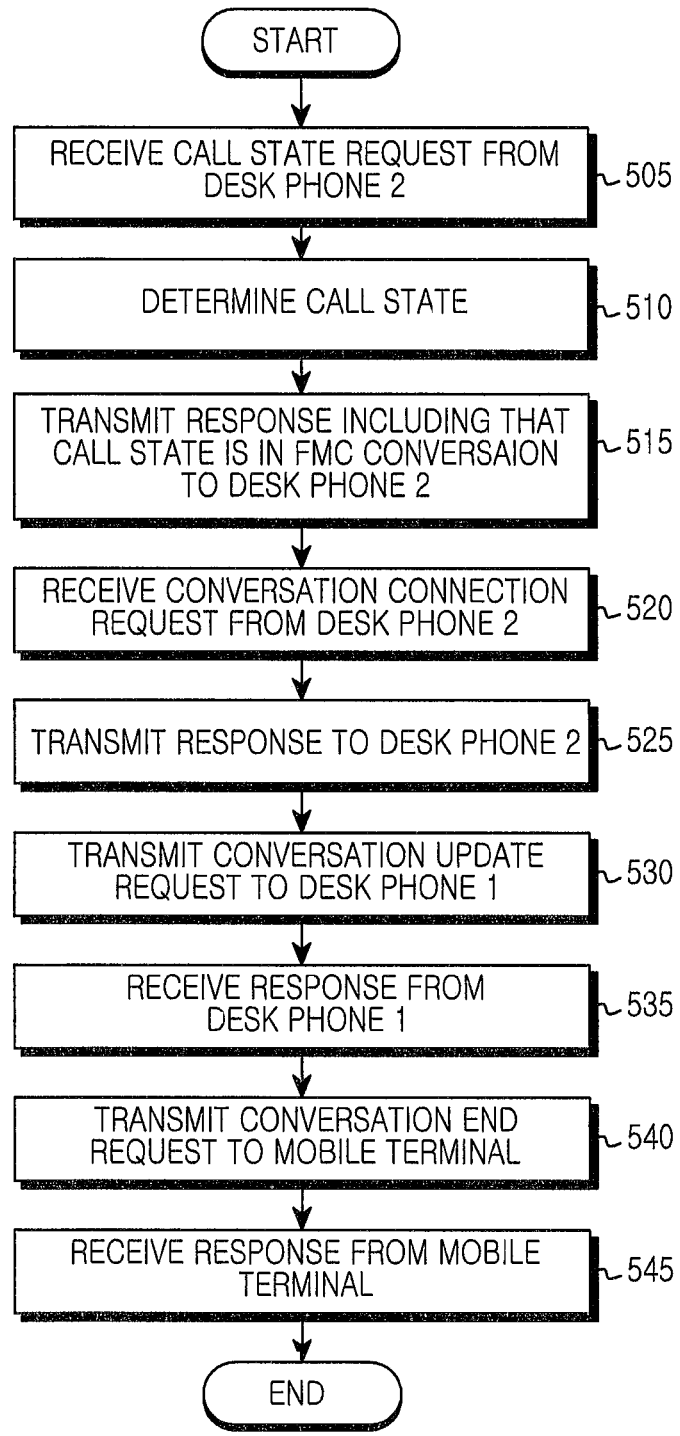
FIG. 5 is a flowchart illustrating an example operation process of an enterprise server during a call move process between terminals according to at least the 1st this disclosure.

FIG. 5 is a flowchart illustrating an example operation process of an enterprise server during a call move process between terminals according to at least the 1st embodiment of this disclosure.

Referring to FIG. 5, the enterprise server receives a call state request from a desk phone 2 (step 505). The call state request is to request a state of a call that the mobile terminal has requested to move. The desk phone 2 transmits the call state request to the enterprise server using a SIP message. The SIP message can be a message such as NOTIFY, INFO and the like.

Next, the enterprise server determines the call state (step 510). If it is determined that the call state is in FMC conversation, the enterprise server transmits to the desk phone 2 a response including that the call state is in the FMC conversation (step 515). Here, the enterprise server searches a database for a MIN or extension phone number of the mobile terminal having requested call state information and performs MIN or extension phone number registration or non-registration and conversation state query. Here, the FMC represents an application performing a VoIP service using WiFi wireless communication.

The response including that the call state is in the FMC conversation can be a 200 OK message among the SIP message. The enterprise server can add a proprietary header within the 200 OK message and notify the database search result to the desk phone 2.

Next, the enterprise server receives a conversation connection request for the call, from the desk phone 2 (step 520). Here, an INVITE message is used among the SIP message. Here, because the desk phone 2 has been notified from the enterprise server that it is a state where the call move is possible, the desk phone 2 transmits to the enterprise server an originating request of requesting to move the call to the desk phone 2.

After that, the enterprise server transmits a response to the desk phone 2 (step 525).

Next, the enterprise server transmits a conversation update request (such as a call update request) to the desk phone 1 (step 530). Here, a Re-INVITE message is used among the SIP message. The Re-INVITE message is a message of the same kind as that of the INVITE message or a message of requesting update for an existing established call. The call uses an existing call session between the desk phone 1 and the mobile terminal.

After that, the enterprise server receives a response from the desk phone 1 (step 535). This represents that the call move is completed.

Next, the enterprise server requests a conversation end to the mobile terminal (step 540). Here, a BYE message is used among the SIP message. After that, the enterprise server receives a response from the mobile terminal (step 545). Next, conversation between the desk phone 1 and the desk phone 2 is performed.

Figure 6:
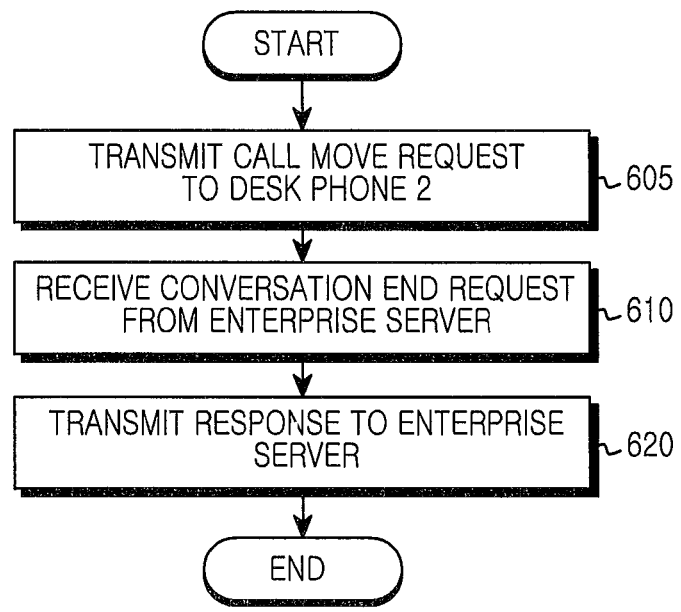
FIG. 6 is a flowchart illustrating an example operation process of a mobile terminal during a call move process between terminals according to at least the 1st this disclosure.

FIG. 6 is a flowchart illustrating an example operation process of a mobile terminal during a call move process between terminals according to at least the 1st embodiment of this disclosure.

Referring to FIG. 6, if there is a need to move a call of the mobile terminal to a desk phone 2 during conversation with a desk phone 1, the mobile terminal transmits a call move request to the desk phone 2 (step 605).

This call move request can be performed by user's selection. And, the call move request between terminals can be achieved through NFC communication. At NFC communication, a Bluetooth MAC address is transmitted together with terminal information and thus, a Bluetooth pairing process can be performed at one time. Also, the call move request between the terminals can be transmitted using a dedicated application.

The call move request can include terminal registration information as follows. That is, the call move request can include information such as a phone number or an extension phone number, a wireless LAN IP address and a wireless LAN MAC address (such as a wireless LAN IP address of a requesting terminal and a wireless LAN MAC address thereof), a request service type (such as a call move request), and a Bluetooth MAC address (such as a Bluetooth MAC address of the requesting terminal).

After that, the mobile terminal receives a conversation end request from an enterprise server (step 610). Here, a BYE message is used among the SIP message. Next, the mobile terminal transmits a response to the enterprise server (step 620).

After that, conversation between the desk phone 1 and the desk phone 2 is performed.

Figure 7:
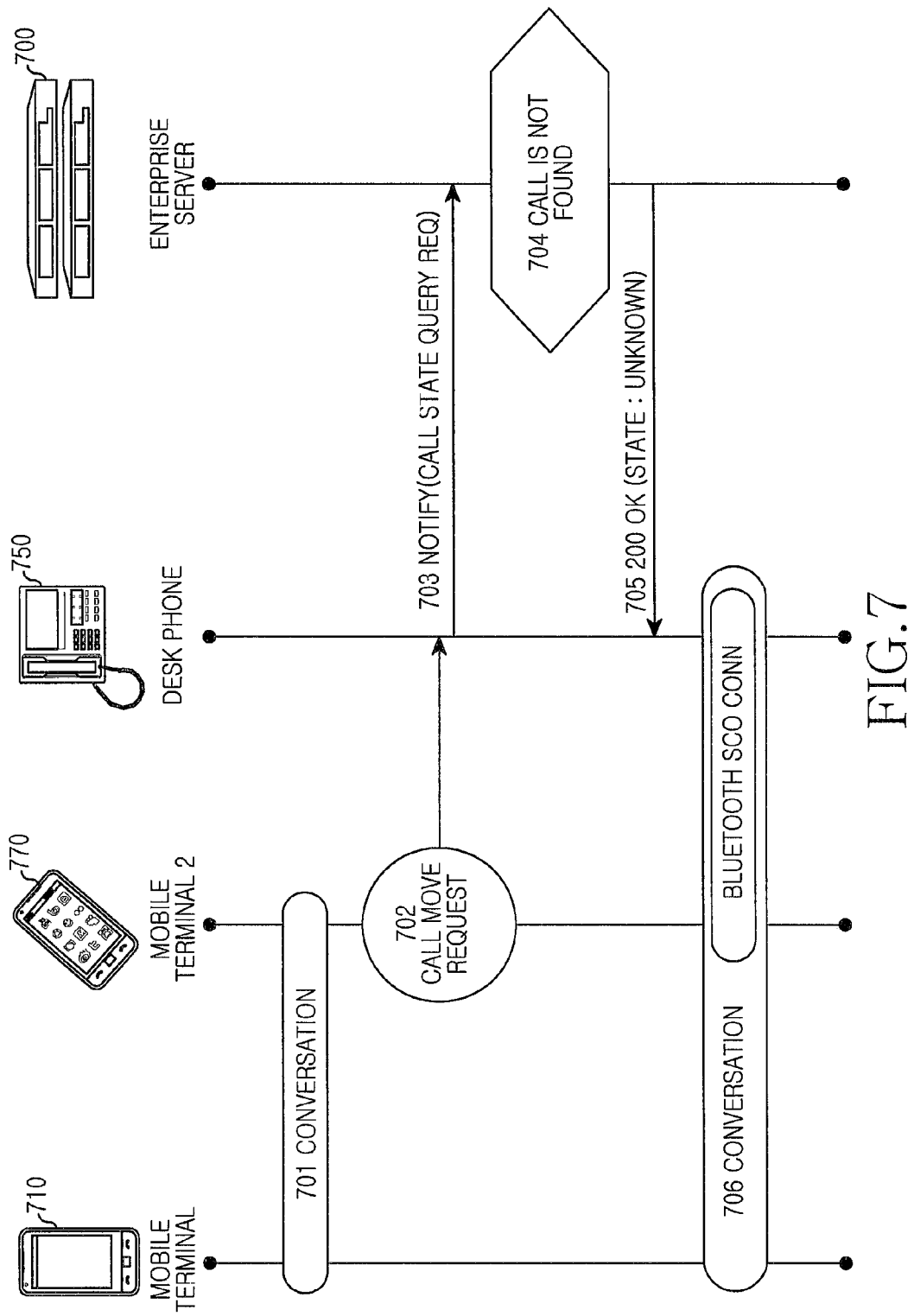
FIG. 7 is a message flowchart illustrating an example call move process between terminals according to at least a 2nd embodiment of this disclosure.

FIG. 7 is a message flowchart illustrating an example call move process between terminals according to at least a 2nd embodiment this disclosure.

Referring to FIG. 7, if there is a need to move a call of a mobile terminal 2 770 to a desk phone 750 during conversation with a mobile terminal 710 (step 701), the mobile terminal 2 770 transmits a call move request to the desk phone 750 (step 702).

This call move request can be performed by user's selection. And, the call move request between terminals can be achieved through NFC communication. At NFC communication, a Bluetooth MAC address is transmitted together with terminal information and thus, a Bluetooth pairing process can be performed at one time. Also, the call move request between the terminals can be transmitted using a dedicated application.

The call move request can include registration information as follows. That is, the call move request can include information such as a phone number or an extension phone number, a wireless LAN IP address and a wireless LAN MAC address (such as a wireless LAN IP address of a requesting terminal and a wireless LAN MAC address thereof), a request service type (such as a call move request), and a Bluetooth MAC address (such as a Bluetooth MAC address of the requesting terminal).

After that, the desk phone 750 transmits a call state request to an enterprise server 700 (step 703). The call state request is to request a state of a call that the mobile terminal 2 770 has requested to move. The desk phone 750 transmits the call state request to the enterprise server 700 using a SIP message. The SIP message can be a message such as NOTIFY, INFO and the like. In FIG. 7, utilizing the NOTIFY message is disclosed.

Next, if it is determined that the call state is not in FMC conversation (step 704), the enterprise server 700 transmits to the desk phone 750 a response including that the call state is not in the FMC conversation (step 705). Here, the enterprise server 700 searches a database for a MIN or extension phone number of the mobile terminal 2 770 having requested call state information and performs MIN or extension phone number registration or non-registration and conversation state query. Here, the FMC represents an application performing a VoIP service using WiFi wireless communication.

The response including that the call state is not in the FMC conversation can be a 200 OK message among the SIP message. The enterprise server 700 can add a proprietary header within the 200 OK message and notify the database search result to the desk phone 750.

After that, the desk phone 750 recognizes that the call state received from the enterprise server 700 is not in the FMC conversation, that is, recognizes that the received call state is a call not going through the enterprise server 700. And then, the desk phone 750 establishes a conversation path using wireless connection (such as Bluetooth, WiFi) with the mobile terminal 2 770, and perform conversation with the mobile terminal 710 through the established the wireless connection.

Upon receiving the call move request of the mobile terminal 2 770, the desk phone 750 can acquire a Bluetooth MAC address of the mobile terminal 2 770 and perform Bluetooth pairing with the mobile terminal 2 770. In the drawing, Synchronous Connection Oriented (SCO) represents a Bluetooth audio data transmission path.

The desk phone 750 can establish a Bluetooth data communication path with the mobile terminal 2 770. If there is a DTMF input to the desk phone 750, the desk phone 750 can transmit information including the DTMF input, to the mobile terminal 2 770, and the mobile terminal 2 770 can transmit the information including the DTMF input, to a corresponding device.

Figure 8:
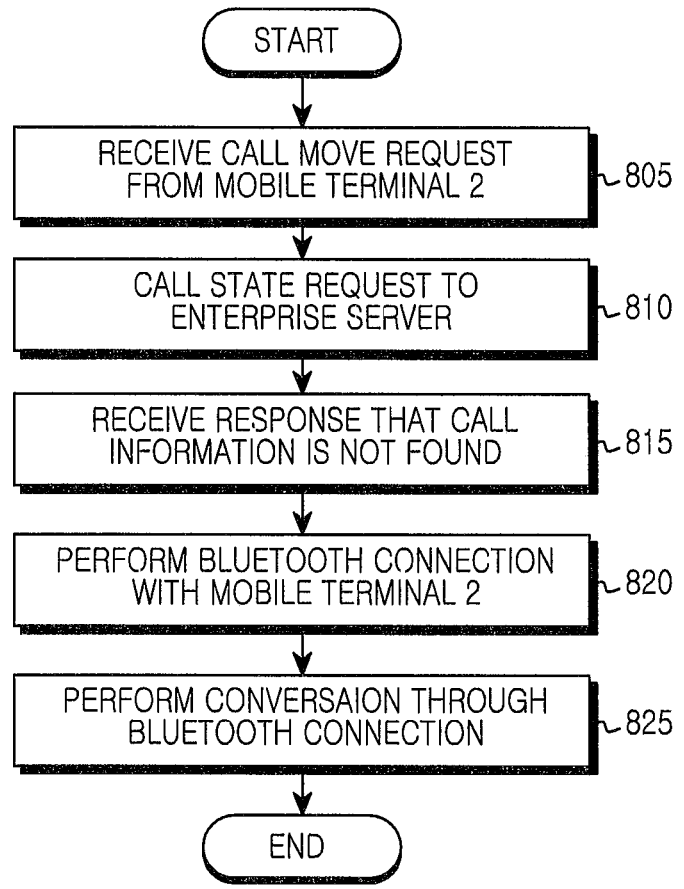
FIG. 8 is a flowchart illustrating an example operation process of a desk phone during a call move process between terminals according to at least the 2nd embodiment this disclosure.

FIG. 8 is a flowchart illustrating an example operation process of a desk phone during a call move process between terminals according to at least the 2nd embodiment of this disclosure.

Referring to FIG. 8, a desk phone receives a call move request from a mobile terminal 2 (step 805). This call move request can be performed by user's selection. And, the call move request between terminals can be achieved through NFC communication. At NFC communication, a Bluetooth MAC address is transmitted together with terminal information and thus, a Bluetooth pairing process can be performed at one time. Also, the call move request between the terminals can be transmitted using a dedicated application.

The call move request can include information as follows. That is, the call move request can include information such as a phone number or an extension phone number, a wireless LAN IP address and a wireless LAN MAC address (such as a wireless LAN IP address of a requesting terminal and a wireless LAN MAC address thereof), a request service type (such as a call move request), and a Bluetooth MAC address (such as a Bluetooth MAC address of the requesting terminal).

After that, the desk phone transmits a call state request to an enterprise server (step 810). The call state request is to request a state of a call that the mobile terminal 2 has requested to move. The desk phone transmits the call state request to the enterprise server using a SIP message. The SIP message can be a message such as NOTIFY, INFO and the like.

Next, the desk phone receives a response that the call state is not in FMC conversation, from the enterprise server (step 815).

The response including that the call state is not in the FMC conversation can be a 200 OK message among the SIP message. The enterprise server can add a proprietary header within the 200 OK message and notify the database search result to the desk phone.

After that, the desk phone recognizes that the call state received from the enterprise server is not in the FMC conversation, that is, recognizes that the received call state is a call not going through the enterprise server. And then, the desk phone establishes a conversation path using wireless connection (such as Bluetooth, WiFi) with the mobile terminal 2 (step 820), and performs conversation with the mobile terminal through the established the wireless connection (step 825).

Upon receiving the call move request of the mobile terminal 2, the desk phone can acquire a Bluetooth MAC address of the mobile terminal 2 and perform Bluetooth pairing with the mobile terminal 2.

Though not illustrated in the drawing, the desk phone can establish a Bluetooth data communication path with the mobile terminal 2. If there is a DTMF input to the desk phone, the desk phone can transmit information including the DTMF input, to the mobile terminal 2, and the mobile terminal 2 can transmit the information including the DTMF input, to a corresponding device being in conversation.

Figure 9:
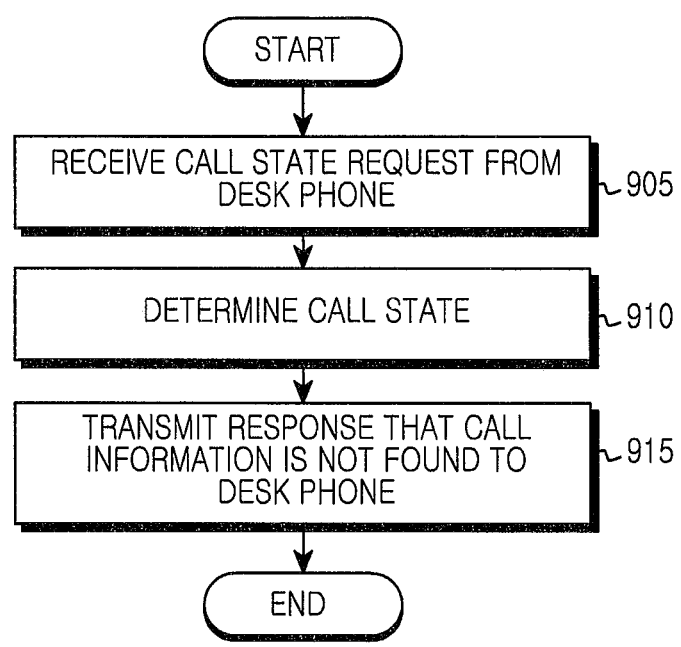
FIG. 9 is a flowchart illustrating an example operation process of an enterprise server during a call move process between terminals according to at least the 2nd embodiment of this disclosure.

FIG. 9 is a flowchart illustrating an example operation process of an enterprise server during a call move process between terminals according to at least the 2nd embodiment of this disclosure.

Referring to FIG. 9, the enterprise server receives a call state request from a desk phone (step 905). The call state request is to request a state of a call that a mobile terminal 2 has requested to move. The desk phone transmits the call state request to the enterprise server using a SIP message. The SIP message can be a message such as NOTIFY, INFO and the like.

Next, the enterprise server determines the call state (step 910). If it is determined that the call state is not in FMC conversation, the enterprise server transmits to the desk phone a response including that the call state is not in the FMC conversation (step 915). Here, the enterprise server searches a database for a MIN or extension phone number of the mobile terminal 2 having requested call state information and performs MIN or extension phone number registration or non-registration and conversation state query. Here, the FMC represents an application performing a VoIP service using WiFi wireless communication.

The response including that the call state is not in the FMC conversation can be a 200 OK message among the SIP message. The enterprise server can add a proprietary header within the 200 OK message and notify the database search result to the desk phone.

Figure 10:
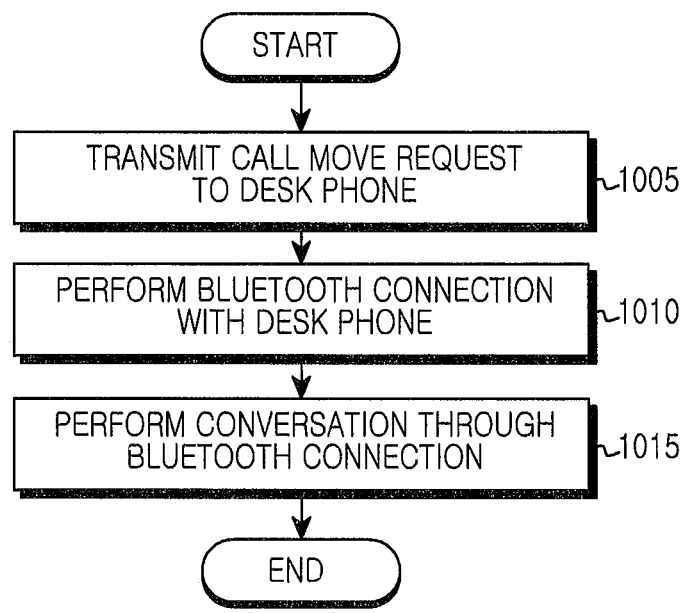
FIG. 10 is a flowchart illustrating an example operation process of a mobile terminal during a call move process between terminals according to at least the 2nd embodiment this disclosure.

FIG. 10 is a flowchart illustrating an example operation process of a mobile terminal 2 during a call move process between terminals according to at least the 2nd embodiment of this disclosure.

Referring to FIG. 10, if there is a need to move a call of the mobile terminal 2 to a desk phone during conversation with a mobile terminal, the mobile terminal 2 transmits a call move request to the desk phone (step 1005).

This call move request can be performed by user's selection. And, the call move request between terminals can be achieved through NFC communication. At NFC communication, a Bluetooth MAC address is transmitted together with terminal information and thus, a Bluetooth pairing process can be performed at one time. Also, the call move request between the terminals can be transmitted using a dedicated application.

The call move request can include registration information as follows. That is, the call move request can include information such as a phone number (such as a MIN) or an extension phone number, a wireless LAN IP address and a wireless LAN MAC address (such as a wireless LAN IP address of a requesting terminal and a wireless LAN MAC address thereof), a request service type (such as a call move request), and a Bluetooth MAC address (such as a Bluetooth MAC address of the requesting terminal).

After that, if sensing a wireless connection (e.g. Bluetooth, WiFi) request of the desk phone, the mobile terminal 2 establishes a conversation path using the wireless connection (e.g. Bluetooth, WiFi) with the desk phone (step 1010), and performs conversation with the mobile terminal through the established Bluetooth path (step 1015).

Upon receiving the call move request of the mobile terminal 2, the desk phone can acquire a Bluetooth MAC address of the mobile terminal 2 and perform Bluetooth pairing with the mobile terminal 2.

The desk phone can establish a Bluetooth data communication path with the mobile terminal 2. If there is a DTMF input to the desk phone, the desk phone can transmit information including the DTMF input, to the mobile terminal 2, and the mobile terminal 2 can transmit the information including the DTMF input, to a corresponding device being in conversation.

Figure 11:
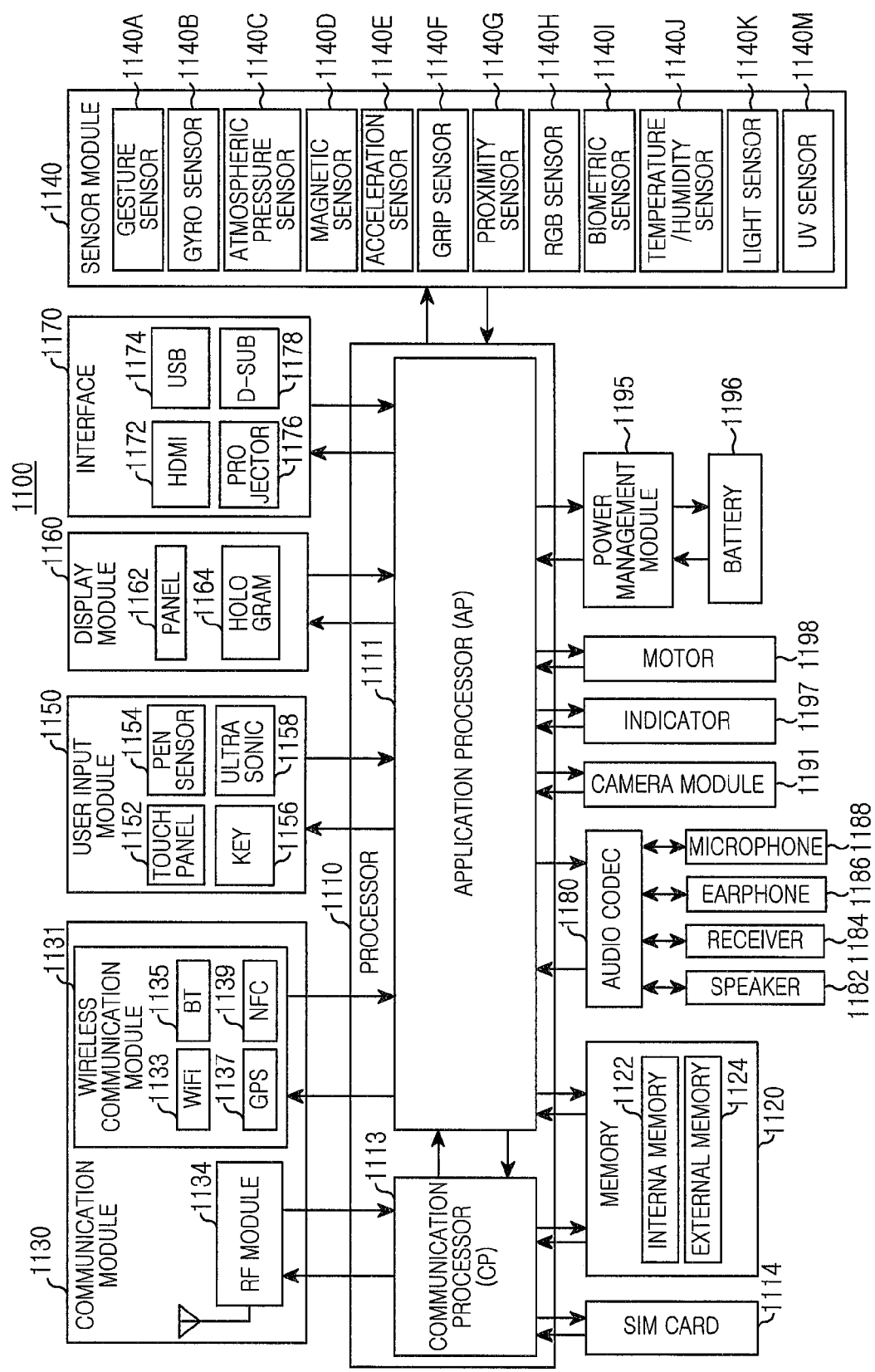
FIG. 11 is a block diagram illustrating an example construction of a mobile terminal according to this disclosure.

FIG. 11 is a block diagram illustrating an example construction of a mobile terminal according to this disclosure.

Referring to FIG. 11, the mobile terminal 1100 can include one or more processors 1110, a Subscriber Identification Module (SIM) card 1114, a memory 1120, a communication module 1130, a sensor module 1140, a user input module 1150, a display module 1160, an interface 1170, an audio codec 1180, a camera module 1191, a power management module 1195, a battery 1196, an indicator 1197, and a motor 1198.

The processor 1110 can include one or more Application Processors (APs) 1111 or one or more Communication Processors (CPs) 1113.

The processor 1110 is illustrated as the AP 1111 and the CP 1113 are included within the processor 1110, but the AP 1111 and the CP 1113 can be included within different IC packages, respectively. In one exemplary embodiment, the AP 1111 and the CP 1113 can be included within one IC package.

The AP 1111 can drive an operating system or an application program and control a plurality of hardware or software constituent elements connected to the AP 1111, and perform processing and operation of various data including multimedia data. The AP 1111 can be, for example, implemented as a System on Chip (SoC). According to one exemplary embodiment, the processor 1110 can further include a Graphic Processing Unit (GPU).

The CP 1113 can perform a function of managing a data link and converting a communication protocol in communication between a terminal including the hardware 1100 and other electronic devices connected through a network. The CP 1113 can be implemented as a SoC, for example. According to one exemplary embodiment, the CP 1113 can perform at least part of a multimedia control function. The CP 1113 can perform terminal distinction and authorization within a communication network, using a subscriber identity module (e.g., the SIM card 1114). Also, the CP 1113 can provide services such as voice telephony, video telephony, a text message, packet data and the like to a user.

Also, the CP 1113 can control data transmission/reception of the communication module 1130. Although FIG. 11 illustrates the constituent elements such as the CP 1113, the power management module 1195, the memory 1120 and the like as constituent elements separate from the AP 1111, according to one exemplary embodiment, the AP 1111 can be implemented to include at least some (e.g., the CP 1113) of the aforementioned constituent elements.

According to one exemplary embodiment, the AP 1111 or the CP 1113 can load to a volatile memory an instruction or data received from a non-volatile memory connected to each of the AP 1111 and the CP 1113 or at least one of other constituent elements, and process the loaded instruction or data. Also, the AP 1111 or the CP 1113 can store in the non-volatile memory data received from at least one of the other constituent elements or generated by at least one of the other constituent elements.

The SIM card 1114 can be a card implementing the subscriber identity module, and can be inserted into a slot provided in a specific location of an electronic device. The SIM card 1114 can include unique identification information (e.g., Integrated Circuit Card ID (ICCID)) or subscriber information (e.g., International Mobile Subscriber Identity (IMSI)).

The memory 1120 can include an internal memory 1122 or an external memory 1124. The internal memory 1122 can include, for example, at least one of a volatile memory (e.g., a Dynamic Random Access Memory (DRAM), a Static Random Access Memory (SRAM), a Synchronous Dynamic Random Access Memory (SDRAM) and the like) or a non-volatile memory (e.g., a One Time PROM (OTPROM), a Programmable ROM (PROM), an Erasable Programmable ROM (EPROM), an Electrically Erasable Programmable ROM (EEPROM), a mask Read Only Memory (ROM), a flash ROM, a Not AND (NAND) flash memory, a Not OR (NOR) flash memory and the like). According to one exemplary embodiment, the internal memory 1122 can also take a form of Solid State Drive (SSD). The external memory 1124 can further include, for example, Compact Flash (CF), Secure Digital (SD), Micro Secure Digital (Micro-SD), Mini Secure Digital (Mini-SD), extreme Digital (xD), a memory stick and the like.

The communication module 1130 can include a wireless communication module 1131 or a Radio Frequency (RF) module 1134. The wireless communication module 1131 can include, for example, WiFi 1133, Bluetooth (BT) 1135, GPS 1137 and NFC 1139. For example, the wireless communication module 1131 can provide a wireless communication function using radio frequency. Additionally or alternatively, the wireless communication module 1131 can include a network interface (e.g., a LAN card), a modem or the like for connecting the hardware 1100 with a network (e.g., the Internet, a LAN, a Wide Area Network (WAN), a telecommunication network, a cellular network, a satellite network, a Plain Old Telephone Service (POTS) or the like).

The RF module 1134 can take charge of transmission/reception of data, for example, transmission/reception of an RF signal or a called electronic signal. The RF module 1134 can include, though not illustrated, for example, a transceiver, a Power Amp Module (PAM), a frequency filter, a Low Noise Amplifier (LNA) or the like. Also, the RF module 1134 can further include a component for transmitting/receiving an electromagnetic wave on a free space in a wireless communication, for example, a conductor, a conductive line or the like.

The sensor module 1140 can include, for example, at least one of a gesture sensor 1140A, a gyro sensor 1140B, an air pressure sensor 1140C, a magnetic sensor 1140D, an acceleration sensor 1140E, a grip sensor 1140F, a proximity sensor 1140G, a Red, Green, Blue (RGB) sensor 1140H, a biological sensor 1140I, a temperature/humidity sensor 1140J, a light sensor 1140K, and a Ultraviolet (UV) sensor 1140M. The sensor module 1140 can measure a physical quantity or sense an activation state of the electronic device and convert measured or sensed information into an electrical signal. Additionally or alternatively, the sensor module 1140 can include, for example, an Electronic nose (E-nose) sensor, an Electromyography (EMG) sensor, an Electroencephalogram (EEG) sensor, an Electrocardiogram (ECG) sensor, a fingerprint sensor and the like. The sensor module 1140 can further include a control circuit for controlling at least one or more sensors provided therein.

The user input module 1150 can include a touch panel 1152, a (digital) pen sensor 1154, a key 1156, and an ultrasonic input device 1158. The touch panel 1152 can recognize, for example, a touch input in at least one method among a capacitive method, a pressure sensitive method, an infrared method, and an ultrasonic method. Also, the touch panel 1152 can also further include a controller. In the capacitive method, not only direct touch but also proximity recognition is possible. The touch panel 1152 can also further include a tactile layer. In this case, the touch panel 1152 can provide a tactile response to a user.

The (digital) pen sensor 1154 can be implemented, for example, using the same or similar method with receiving a user's touch input or a separate sheet for recognition. The key 1156 can be, for example, a keypad or a touch key. The ultrasonic input device 1158 is a device capable of determining data by sensing a sound wave with a microphone (e.g., a microphone 1188) of the terminal, and can perform wireless recognition through a pen generating an ultrasonic signal. According to one exemplary embodiment, the hardware 1100 can also receive a user input from an external device (e.g., a network, a computer, or a server) connected to the mobile terminal 1100 using the communication module 1130.

The display module 1160 can include a panel 1162 and a hologram 1164. The panel 1162 can be, for example, a Liquid Crystal Display (LCD), an Active-Matrix Organic Light-Emitting Diode (AMOLED), or the like. The panel 1162 can be implemented to be flexible, transparent, or wearable, for example. The panel 1162 can be also constructed as one module together with the touch panel 1152. The hologram 1164 can show a three-dimensional image in the air by using interference of light. According to one exemplary embodiment, the display module 1160 can further include a control circuit for controlling the panel 1162 and the hologram 1164.

The interface 1170 can include, for example, a High-Definition Multimedia Interface (HDMI) 1172, a Universal Serial Bus (USB) 1174, a projector 1176, and a D-subminiature (D-sub) 1178. Additionally or alternatively, the interface 1170 can include, for example, Secure Digital (SD)/Multi Media Card (MMC) and Infrared Data Association (IrDA).

The audio codec 1180 can convert a voice and an electric signal interactively. The audio codec 1180 can convert, for example, voice information that is inputted or outputted through a speaker 1182, a receiver 1184, an earphone 1186, the microphone 1188, and the like.

The camera module 1191 is a device capable of taking an image and a video. According to one exemplary embodiment, the camera module 1191 can include one or more image sensors (e.g., a front lens or a rear lens), an Image Signal Processor (ISP), and a flash LED.

The power management module 1195 can manage power of the hardware 1100. Though not illustrated, the power management module 1195 can include, for example, a Power Management Integrated Circuit (PMIC), a charger Integrated Circuit (IC), and a battery gauge.

The PMIC can be mounted, for example, within an integrated circuit or a SoC semiconductor. A charging method can be divided into wired and wireless. The charger IC can charge a battery, and can prevent the inflow of overvoltage or overcurrent from an electric charger. According to one exemplary embodiment, the charger IC can include a charger IC for at least one of a wired charging method and a wireless charging method. As the wireless charging method, there are a magnetic resonance method, a magnetic induction method, an electromagnetic method and the like, for example. The charger IC can be added with additional circuits for wireless charging, for example, circuits of a coil loop, a resonance circuit, a rectifier and the like.

The battery gauge can measure, for example, a level of the battery 1196, a voltage in charging, an electric current, and a temperature. The battery 1196 can generate electricity and supply a power source. The battery 1196 can be, for example, a rechargeable battery.

The indicator 1197 can display a specific state of the hardware 1100 or a part (e.g., the AP 1111) thereof, for example, a booting state, a message state, a charging state and the like. The motor 1198 can convert an electrical signal into a mechanical vibration. A The processor 1110 can control the sensor module 1140.

Though not illustrated, the hardware 1100 can include a processing device (e.g., a GPU) for mobile TV support. The processing device for mobile TV support can process, for example, standard media data of Digital Multimedia Broadcasting (DMB), Digital Video Broadcasting (DVB), a media flow and the like.

The names of the aforementioned constituent elements of the hardware 1100 according to the present disclosure can be varied according to the kind of the electronic device. The hardware 1100 according to the present disclosure can include at least one of the aforementioned constituent elements, and can omit some constituent elements or further include additional other constituent elements. Also, some of the constituent elements of the hardware 1100 according to the present disclosure are coupled and constructed as one entity, thereby being able to identically perform the functions of the corresponding constituent elements of before being coupled.

In accordance to the present disclosure, the application processor 1111 includes an authorized device list block 171, a service list block 174, and a service UI 175. The authorized device list block 171 manages information about authorized terminals of FIG. 1. The service list block 174 manages interworking services with the desk phone 150 and the enterprise server 100. By providing a user interface to a user, receiving an instruction from the user through the user interface, and providing the instruction to the corresponding function block in accordance to the kind of the instruction, the service UI 175 enables the user to control the execution of a function of the application processor 1111 through the user interface.

Also, the application processor 1111 includes a service setting management block 176 taking charge of a function of interworking with the enterprise server 100 and the desk phone 150.

The service setting management block 176 performs a function of a mobile terminal of at least the $1^{st}$ exemplary embodiment of this disclosure. If there is a need to move a call of the mobile terminal to a desk phone 2 during conversation with a desk phone 1, the service setting management block 176 transmits a call move request to the desk phone 2.

The service setting management block 176 receives a conversation end request from an enterprise server, and transmits a response to the enterprise server.

The service setting management block 176 performs a function of a mobile terminal 2 of at least the $2^{nd}$ embodiment of this disclosure.

If there is a need to move a call of the mobile terminal 2 to a desk phone during conversation with a mobile terminal, the service setting management block 176 transmits a call move request to the desk phone.

If sensing a Bluetooth connection request of the desk phone, the service setting management block 176 establishes a conversation path using Bluetooth pairing with the desk phone and performs conversation with the mobile terminal through the established Bluetooth path.

Figure 12:
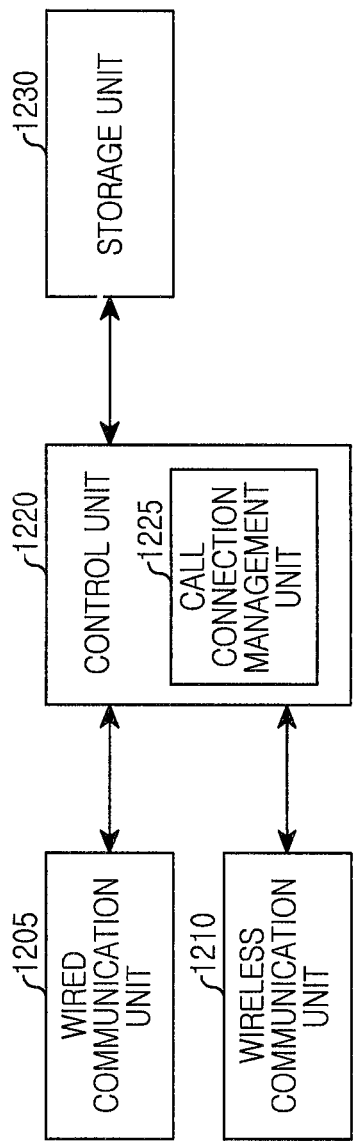
FIG. 12 is a block diagram illustrating an example construction of a desk phone according to this disclosure.

FIG. 12 is a block diagram illustrating an example construction of a desk phone according to this disclosure.

Referring to FIG. 12, the desk phone includes a wired communication unit 1205, a wireless communication unit 1210, a control unit 1220, and a storage unit 1230.

The wired communication unit 1205 a module for communicating with other device, and includes a wired processing unit, a baseband processing unit, and the like. The wired processing unit converts a signal received through a wired path into a baseband signal and provides the baseband signal to the baseband processing unit, and converts a baseband signal from the baseband processing unit into a wireless signal such that it can actually transmit on the wired path, and transmits the wireless signal through the wired path.

The wireless communication unit 1210 is a module for communicating with other device, and includes a wireless processing unit, a baseband processing unit, and the like. The wireless processing unit converts a signal received through an antenna into a baseband signal and provides the baseband signal to the baseband processing unit, and converts a baseband signal from the baseband processing unit into a wireless signal such that it can actually transmit on a wireless path, and transmits the wireless signal through the antenna.

The control unit 1220 controls a general operation of the desk phone. For example, the control unit 1220 performs processing and control for voice telephony and packet communication and, particularly, includes a call connection management unit 1225 in accordance with this disclosure. The control unit 1220 can perform a function of the call connection management unit 1225. Separately constructing and illustrating these in this disclosure is for distinguishing and describing the respective functions.

Accordingly, in the aforementioned block construction, when a product is actually implemented, it can be constructed such that the control unit 1220 processes all of functions of the call connection management unit 1225, or can be constructed such that the control unit 1220 processes only some of the functions.

The storage unit 1230 performs a function of storing a program for controlling a general operation of the desk phone and temporary data generated during program execution. Particularly, in accordance with this disclosure, the storage unit 1230 can store information about a mobile terminal.

The call connection management unit 1225 includes a VoIP service controller 151, a service UI 152, and a service setting management block 153. The VoIP service controller 151 controls VoIP telephony. By providing a user interface to a user, receiving an instruction from the user through the user interface, and providing the instruction to the corresponding function block in accordance to the kind of the instruction, the service UI 152 enables the user to control the execution of a function of the desk phone 150 through the user interface. The service setting management block 153 takes charge of a function of interworking with the enterprise server and the mobile terminal.

The call connection management unit 1225 includes an authorized device list block 154 for managing information about an authorized terminal.

The call connection management unit 1225 performs a function of a desk phone of at least the $1^{st}$ embodiment this disclosure.

The call connection management unit 1225 receives a call move request from a mobile terminal.

The call connection management unit 1225 transmits a call state request to an enterprise server.

If receiving from the enterprise server a response including that a call state is in FMC conversation, the call connection management unit 1225 requests a conversation connection for the call, to the enterprise server.

The call connection management unit 1225 receives a response from the enterprise server.

The call connection management unit 1225 performs a function of a desk phone of at least the $2^{nd}$ embodiment of this disclosure.

The call connection management unit 1225 receives a call move request from a mobile terminal 2.

The call connection management unit 1225 transmits a call state request to an enterprise server.

The call connection management unit 1225 receives from the enterprise server a response including that a call state is not in FMC conversation.

The call connection management unit 1225 recognizes that the call state received from the enterprise server is not in the FMC conversation, that is, recognizes that the received call state is a call not going through the enterprise server. And then, the call connection management unit 1225 establishes a conversation path using Bluetooth pairing with the mobile terminal 2, and performs conversation with a mobile terminal through the established Bluetooth path.

Upon receiving the call move request of the mobile terminal 2, the call connection management unit 1225 can acquire a Bluetooth MAC address of the mobile terminal 2 and perform Bluetooth pairing with the mobile terminal 2.

Figure 13:
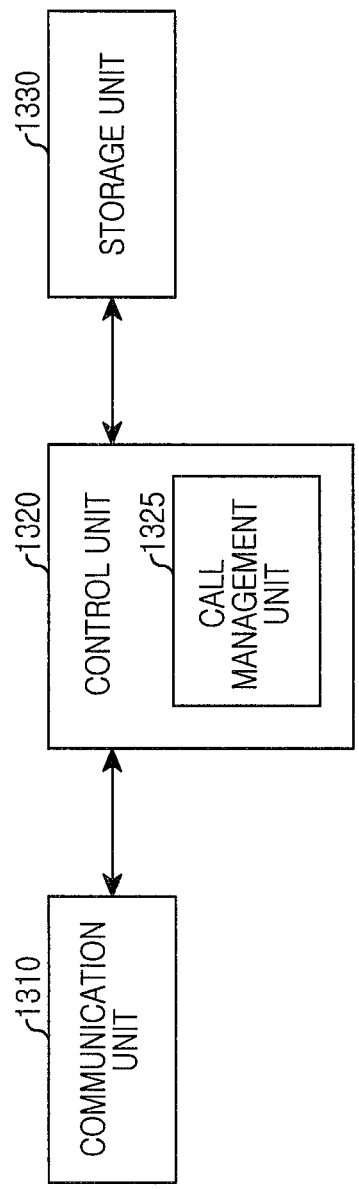
FIG. 13 is a block diagram illustrating an example construction of an enterprise server according to this disclosure.

FIG. 13 is a block diagram illustrating an example construction of an enterprise server according to this disclosure.

Referring to FIG. 13, the enterprise server includes a communication unit 1310, a control unit 1320, and a storage unit 1330.

The communication unit 1310 is a module for communicating with other device, and includes a wired processing unit, a baseband processing unit, and the like. The wired processing unit converts a signal received through a wired path into a baseband signal and provides the baseband signal to the baseband processing unit, and converts a baseband signal from the baseband processing unit into a wireless signal such that it can actually transmit on the wired path, and transmits the wireless signal through the wired path.

The control unit 1320 controls a general operation of the enterprise server. For example, the control unit 1320 performs processing and control for FMC function operation and, particularly, includes a call management unit 1325 in accordance to this disclosure. The control unit 1320 can perform a function of the call management unit 1325. Separately constructing and illustrating these in this disclosure is for distinguishing and describing the respective functions.

Accordingly, in the aforementioned block construction, when a product is actually implemented, it can be constructed such that the control unit 1320 processes all of functions of the call management unit 1325, or can be constructed such that the control unit 1320 processes only some of the functions.

The storage unit 1330 performs a function of storing a program for controlling a general operation of the enterprise server and temporary data generated during program execution. Particularly, the storage unit 1330 can store call state information about terminals.

The call management unit 1325 includes a call service engine 101, a subscriber state monitoring block 102, and a subscriber setting/authorization/registration management block 103. The subscriber setting/authorization/registration management block 103 takes charge of a function of setting, authorizing and registering a subscriber to the enterprise server of FIG. 1. The call service engine 101 provides a call service to the registered subscriber. The subscriber state monitoring block 102 monitors a current state of a requested subscriber or a specific subscriber among subscribers. For example, the subscriber state monitoring block 102 decides whether the subscriber is receiving the call service through the enterprise server 100.

The call management unit 1325 performs a function of an enterprise server of at least the $1^{st}$ embodiment this disclosure.

The call management unit 1325 receives a call state request from a desk phone 2.

The call management unit 1325 determines the call state. If it is determined that the call state is in FMC conversation, the call management unit 1325 transmits to the desk phone 2 a response including that the call state is in the FMC conversation. Here, the call management unit 1325 searches a database for a MIN or extension phone number of a mobile terminal having requested call state information and performs MIN or extension phone number registration or non-registration and conversation state query. Here, the FMC represents an application performing a VoIP service using WiFi wireless communication.

The call management unit 1325 receives a conversation connection request for the call, from the desk phone 2, and transmits a response to the desk phone 2.

The call management unit 1325 transmits a conversation update request to a desk phone 1 and receives a response from the desk phone 1.

The call management unit 1325 requests a conversation end to the mobile terminal and receives a response from the mobile terminal.

The call management unit 1325 performs a function of an enterprise server of at least the $2^{nd}$ embodiment of this disclosure.

The call management unit 1325 receives a call state request from a desk phone.

The call management unit 1325 determines the call state. If it is determined that the call state is not in FMC conversation, the call management unit 1325 transmits to the desk phone a response including that the call state is not in the FMC conversation. Here, the call management unit 1325 searches a database for a MIN or extension phone number of a mobile terminal 2 having requested call state information and performs MIN or extension phone number registration or non-registration and conversation state query. Here, the FMC represents an application performing a VoIP service using WiFi wireless communication.

Embodiments of the present disclosure have an advantage of being capable of enhancing a user's convenience by providing a service of call move between terminals using a Bluetooth protocol, although a user does not use a FMC module performing VoIP communication with an enterprise server, under the enterprise network environment.

Embodiments of the present disclosure have an advantage of being capable of providing a seamless service even to a terminal using a FMC module, by providing a call move service identically for all of a call going through an enterprise server and a 3G/LTE call not going through the enterprise server.

Exemplary embodiments and all function operations of the disclosure described in the present specification can be implemented by computer software including structures disclosed in the present specification and equivalent structures thereof, firmware, hardware or a combination of two or more of them. Also, the exemplary embodiments of the disclosure described in the present specification can be implemented by one or more computer program products, such as data processing devices, or can be implemented by one or more modules of computer program instructions encoded on a computer-readable medium for controlling operations of these devices.

The computer-readable medium can be a machine-readable storage medium, a machine-readable storage substrate, a memory device, a construction of substance affecting a machine-readable radio wave stream, or a combination of two or more of them. The term of data processing device can include, for example, all instruments, devices and machines for processing data including a programmable processor or computer, or a multi-processor or computer. The instrument can include a code added to hardware and generating an execution environment for a corresponding computer program, for example, a code constructing a processor firmware, a protocol stack, a database management system, an operating system, or a combination of two or more of them.

While the disclosure has been shown and described with reference to certain preferred embodiments thereof, it will be understood by those skilled in the art that various changes in form and details may be made therein without departing from the spirit and scope of the disclosure as defined by the appended claims.

What is claimed is:

1. An operation method of a terminal, the method comprising:

receiving a message for requesting to move a call from a first device, wherein the message comprises registration information of the first device that is in communication with a second device;

transmitting a request signal comprising the registration information to a server;

receiving, from the server, a response signal indicating whether the call is controlled by the server or not;

establishing a wireless connection with the first device, if the call is not controlled by the server; and performing the communication with the second device through the first device using the wireless connection.

2. The method of claim 1, wherein the registration information comprises at least one of a phone number, an extension phone number, a wireless Local Area Network (LAN) Internet Protocol (IP) address, a wireless LAN Media Access Control (MAC) address, and a Bluetooth MAC address of the first device.

3. The method of claim 1, wherein the terminal receives the registration information from the first device using at least one among a Near Field Communication (NFC) method and a method through a dedicated application.

4. The method of claim 1, further comprising:
if the call is controlled by the server, transmitting a call connection request signal for call connection with the second device, to the server; and
in accordance to reception of a call connection response signal from the server, performing the communication with the second device.

5. An operation method of a server, the method comprising:
receiving a request signal comprising a registration information of a first device from a terminal;
deciding whether a call for the first device is controlled by the server or not using the registration information; and
in accordance to the decision of the call for the first device, transmitting a response signal to the terminal.

6. The method of claim 5, wherein the registration information comprises at least one of a phone number, an extension phone number, a wireless Local Area Network (LAN) Internet Protocol (IP) address, a wireless LAN Media Access Control (MAC) address, and a Bluetooth MAC address of the first device.

7. The method of claim 5, wherein, if the call is not controlled by the server, transmitting the response signal comprises transmitting to the terminal the response signal indicating that the call is not controlled by the server.

8. The method of claim 5, wherein, if the call is controlled by the server, transmitting the response signal comprises transmitting to the terminal the response signal indicating that the call is controlled by the server.

9. The method of claim 8, further comprising, after transmitting the response signal indicating that the call is controlled by the server, receiving a call connection request for the second device from the terminal; and connecting a call between the terminal and the second device.

10. The method of claim 9, wherein connecting by the call between the terminal and the second device comprises:
transmitting a call connection update request signal for call connection between the second device and the terminal, to the second device; and
transmitting a call end signal representing the end of call connection between the first device and the second device, to the first device.

11. An apparatus of a terminal, the apparatus comprising:
a communication unit configured to communicate with another node; and
a control unit configured to receive a message for requesting to move a call from a first device, wherein the message comprises registration information of the first device that is in communication with a second device, to transmit a request signal comprising the registration information to a server, to receive a response signal indicating whether the call is controlled by the server or not from the server, to establish a wireless connection with the first device, if the call is not controlled by the server, and to perform the communication with the second device through the first device using the wireless connection.

12. The apparatus of claim 11, wherein the registration information comprises at least one of a phone number, an extension phone number, a wireless Local Area Network (LAN) Internet Protocol (IP) address, a wireless LAN Media Access Control (MAC) address, and a Bluetooth MAC address of the first device.

13. The apparatus of claim 11, wherein the communication unit is configured to receive the registration information from the first device using at least one among a Near Field Communication (NFC) method and a method through a dedicated application.

14. The apparatus of claim 11, wherein, if the call is controlled by the server, the control unit is configured to control to transmit a call connection request signal for call connection with the second device, to the server, and, in accordance to reception of a call connection response signal from the server, perform the communication with the second device.

15. An apparatus of a server, the apparatus comprising:
a communication unit configured to communicate with another node; and
a control unit configured to receive a call state request signal comprising a registration information of a first device from a terminal, to decide whether a call for the first device is controlled by the server or not using the registration information, and to transmit a response signal to the terminal, in accordance to the decision of the call for the first device.

16. The apparatus of claim 15, wherein the registration information comprises at least one of a phone number, an extension phone number, a wireless Local Area Network (LAN) Internet Protocol (IP) address, a wireless LAN Media Access Control (MAC) address, and a Bluetooth MAC address of the first device.

17. The apparatus of claim 15, wherein, if the call is not controlled by the server, the control unit is configured to transmit to the terminal the response signal indicating that the call is not controlled by the server.

18. The apparatus of claim 15, wherein, if the call is controlled by the server, the control unit is configured to transmit to the terminal the response signal indicating that the call is controlled by the server.

19. The apparatus of claim 17, wherein, after transmitting to the terminal the response signal indicating that the call is controlled by the server, if receiving a call connection request for the second device from the terminal, the control unit is configured to connect a call between the terminal and the second device.

20. The apparatus of claim 19, wherein the control unit is configured to control to transmit a call connection update request signal for call connection between the second device and the terminal, to the second device, and control to transmit a call end signal representing the end of call connection between the first device and the second device, to the first device.

* * * * *